(12) United States Patent
Miyazawa

(10) Patent No.: US 10,747,966 B2
(45) Date of Patent: Aug. 18, 2020

(54) CARD READER

(71) Applicant: NIDEC SANKYO CORPORATION, Suwa-gun Nagano (JP)

(72) Inventor: Shinya Miyazawa, Suwa-gun Nagano (JP)

(73) Assignee: NIDEC SANKYO CORPORATION, Suwa-Gun, Nagano (JP)

(*) Notice: Subject to any disclaimer, the term of this patent is extended or adjusted under 35 U.S.C. 154(b) by 126 days.

(21) Appl. No.: 16/019,958

(22) Filed: Jun. 27, 2018

(65) Prior Publication Data

US 2019/0005279 A1    Jan. 3, 2019

(30) Foreign Application Priority Data

Jun. 28, 2017  (JP) .................................. 2017-126362

(51) Int. Cl.
*G06K 7/08*      (2006.01)
*G06K 13/08*     (2006.01)

(52) U.S. Cl.
CPC ............. *G06K 7/087* (2013.01); *G06K 13/08* (2013.01)

(58) Field of Classification Search
CPC ........ G06K 7/084; G06K 7/087; G06K 13/06; G06K 13/063; G06K 13/07; G06K 13/08; G06K 13/085; G06K 13/0856; G06K 13/0862; G06K 13/0868; G06K 13/0875
See application file for complete search history.

(56) References Cited

U.S. PATENT DOCUMENTS

| 6,042,010 A | * | 3/2000 | Kanayama | G06K 7/084 |
| | | | | 235/379 |
| 2012/0307499 A1 | * | 12/2012 | Watanabe | G06K 13/08 |
| | | | | 362/253 |
| 2016/0300084 A1 | * | 10/2016 | Kuwaki | G06K 7/0091 |

FOREIGN PATENT DOCUMENTS

JP          2015092307 A       5/2015

\* cited by examiner

*Primary Examiner* — Thien M Le
*Assistant Examiner* — April A Taylor
(74) *Attorney, Agent, or Firm* — Cantor Colburn LLP

(57) ABSTRACT

A card reader may include a main body frame comprising a bag-shaped card holding portion and a partitioning portion; a case body; a locking member; a driving mechanism; and a sealing member. The locking member may be provided on the front side of the partitioning portion. The driving mechanism may include a driving source and a power transmission mechanism. The driving source and the power transmission mechanism or the power transmission mechanism may include a sliding member. An opening may be formed in the partitioning portion. The sealing member may include a seal body portion, and a cylindrical cover portion. A through hole may be formed to penetrate the seal body portion. A first end of the cover portion is connected to the seal body portion. The sliding member may penetrate through the cover portion. The cover portion may extend and contract in the front-rear direction.

16 Claims, 5 Drawing Sheets

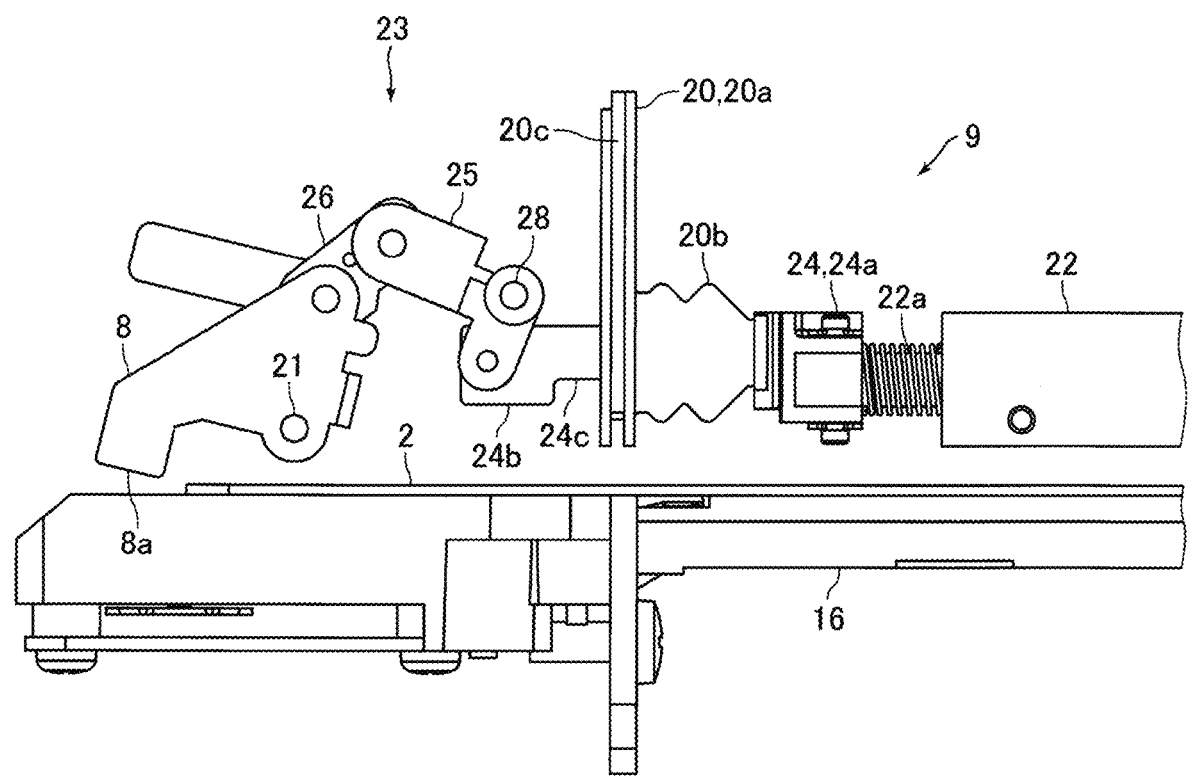
FIG. 5
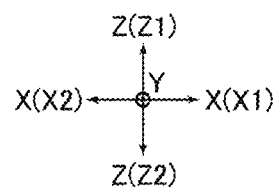

CARD READER

CROSS REFERENCE TO RELATED APPLICATION

The present invention claims priority under 35 U.S.C. § 119 to Japanese Application No. 2017-126362 filed Jun. 28, 2017, the entire content of which is incorporated herein by reference.

BACKGROUND

1. Field of the Invention

At least an embodiment of the present invention relates to a card reader that reads data recorded on a card and records data on a card.

2. Description of Related Art

A card reader that reads data recorded on a card and records data on a card has been proposed (e.g., see Japanese Unexamined Patent Application Publication No. 2015-92307 (PTL 1)). The card reader described in PTL 1 includes a locking lever that prevents removal of the card inserted into the card reader. The card reader described in PTL 1 further includes a case body formed by a front cover in which a card insertion opening is formed and a case main body, and a main body frame fixed to the front cover and is housed in the case body.

In the card reader described in PTL 1, the main body frame includes a head placement portion on which a magnetic head is placed, a card guide portion that guides a card inserted through the card insertion opening, a bag-shaped card holding portion in which a rear end of the card inserted through the card insertion opening is placed, and a partitioning portion extending as a flange from a front end of the card holding portion. The head placement portion and the card guide portion are placed on the front side of the partitioning portion. A sealing member is placed between the head placement portion and the card guide portion, and the partitioning portion. In the card reader described in PTL 1, an area behind the partitioning portion, outside the card holding portion, and surrounded by the partitioning portion and the case body is a water-proof area in which ingress of liquids (e.g., water) is prevented. The sealing member placed on the front side of the partitioning portion provides waterproofness to the water-proof area.

In the card reader described in PTL 1, the locking lever is rotatably held on a fixed shaft. A rear end of the locking lever is connected to a solenoid. The fixed shaft and the solenoid are placed inside the water-proof area behind the partitioning portion. A hook portion to engage with an end of the card is formed at a tip end of the locking lever. The hook portion is placed on the front side of the partitioning portion. The locking lever pivots about the fixed shaft to a position at which the card is unremovable with the hook portion being in contact with the end of the card and a position at which the card is removable.

A hole through which the locking lever passes is formed in the partitioning portion. A cover member that prevents liquids (e.g., water) from passing through the hole formed in the partitioning portion is attached to a part of the locking lever placed on the front side of the partitioning portion. The cover member is made of, for example, rubber. An end of the cover member is attached to a front end of the locking lever, and a rear end of the cover member is attached to the partitioning portion. The cover member provides waterproofness to the water-proof area behind the partitioning portion.

SUMMARY

In the card reader described in PTL 1, the cover member is attached to a part of the locking lever placed on the front side of the partitioning portion. When the locking lever is rotated, the cover member contracts on a first side of the rotating direction of the locking lever, and the cover member extends on a second side of the rotating direction of the locking lever. That is, in the card reader described in PTL 1, the cover member transforms in a complicated manner when the locking lever is rotated. Therefore, in the card reader described in PTL 1, if no design consideration is made in terms of, for example, an increased length of the cover member in the front-rear direction or the reduced thickness of the cover member, followability of the cover member to the movement of the locking lever decreases, and the movement of the locking lever may be adversely affected.

At least an embodiment of the present invention provides a card reader in which a locking member that prevents removal of a card inserted into the card reader is placed on a front side of a partitioning portion of a main body frame, a driving source that forms a part of a driving mechanism of the locking member is placed on a depth side of the partitioning portion and, an opening or a hole in which a part of the driving mechanism is placed is formed to penetrate through the partitioning portion. In the provided card reader, a sealing member, of which design can be simplified, is capable of preventing ingress of liquids into a water-proof area located on the depth side of the partitioning portion, and the locking member can be operated properly.

To attain the objective above, the card reader according to at least an embodiment of the present invention is a card reader that performs at least one of reading data recorded on a card and recording data on the card, in which, when a far side in a direction in which the card is inserted into the card reader is a depth side, a card-removing side in a direction in which the card is removed from the card reader is a front side, and a direction in which the card is inserted into and removed from the card reader is a front-rear direction, the card reader including a main body frame that includes a bag-shaped card holding portion in which an end part of the card on the depth side is housed and a partitioning portion that extends like a flange from a front end of the card holding portion; a case body in which the main body frame is housed; a locking member configured to prevent removal of the card inserted into the card reader; a driving mechanism configured to drive the locking member; and a sealing member configured to prevent ingress of liquids into an area located on the depth side of the partitioning portion, outside the card holding portion, and surrounded by the partitioning portion and the case body, wherein the locking member is placed on the front side of the partitioning portion, the driving mechanism includes a driving source placed on the depth side of the partitioning portion and a power transmission mechanism that transmits power of the driving source to the locking member, the driving source and the power transmission mechanism or the power transmission mechanism include a sliding member moving linearly in the front-rear direction, an opening or a hole in which a part of the sliding member is placed is formed in the partitioning portion to penetrate through the partitioning portion in the front-rear direction, the sealing member includes a seal body portion configured to seal the opening or the hole, and a cylindrical cover portion of which first end is connected to the seal body portion and second end is attached to the sliding member, a through hole through which the sliding member is passed is formed to penetrate the seal body portion in the front-rear direction, a first end of the cover portion is connected to a surface on the front side or a surface on the depth side of the seal body portion to surround the through hole, the sliding member is placed to penetrate through the cover portion on an inner peripheral side, and the cover portion extends and contracts in the front-rear direction following the front and rear movement of the sliding member.

In the card reader according to at least an embodiment of the present invention, the driving source for driving the locking member and the power transmission mechanism that transmits power of the driving source to the locking member, or the power transmission mechanism include a sliding member that moves linearly in the front-rear direction. A part of the sliding member is placed in the opening or the hole formed in the partitioning portion of the main body frame. In at least an embodiment of the present invention, the sealing member that prevents ingress of liquids into an area located on the depth side of the partitioning portion, outside the card holding portion, and surrounded by the partitioning portion and the case body includes the seal body portion that seals the opening or the hole, and the cylindrical cover portion of which first end is connected to the seal body portion and second end is attached to the sliding member. The cover portion extends and contracts in the front-rear direction following the front and rear movement of the sliding member.

That is, in at least an embodiment of the present invention, the cover portion of the sealing member that transforms with the movement of the sliding member simply extends and contracts in the front-rear direction. Therefore, in at least an embodiment of the present invention, followability of the cover portion with respect to the movement of the sliding member can be obtained even if the shape, etc., of the cover portion are not that carefully considered. That is, followability of the cover portion with respect to the movement of the locking member can be obtained even if the shape, etc., of the cover portion are not that carefully considered. Therefore, in at least an embodiment of the present invention, a sealing member, of which design can be simplified, is capable of preventing ingress of liquids into a water-proof area located on the depth side of the partitioning portion, and the locking member can be operated properly.

In at least an embodiment of the present invention, the cover portion is desirably formed in a bellows shape. With this configuration, load to which the driving source is exposed upon extension and contraction of the cover portion can be reduced. Therefore, a driving source with lower power can be employed, which can reduce the cost of the card reader.

In at least an embodiment of the present invention, for example, the locking member is pivotable to a card-unremovable position in which the card is unremovable from the card reader, and to a card-removable position in which the card is removable from the card reader, the first end of the cover portion is connected to a surface on the depth side of the seal body portion, and the cover portion is placed on the depth side of the partitioning portion. In this case, a mechanism for changing a linear movement of the sliding member into a rotating movement of the locking member is placed on the front side of the partitioning portion. Therefore, compared to when the cover portion is placed on the front side of the partitioning portion, the cover portion can be placed easily.

In at least an embodiment of the present invention, an opening extending to reach an end surface of the partitioning portion in a thickness direction of the card inserted into the card reader is desirably formed in the partitioning portion. With this configuration, for example, when the main body frame is formed by resin molding, a structure of the mold used for forming the main body frame can be simplified. That is, when the hole penetrating through the partitioning portion in the front-rear direction is formed in the partitioning portion, a sliding mold is necessary as a mold used for forming the main body frame, whereas when the opening extending to reach an end surface of the partitioning portion in the thickness direction of the card is formed in the partitioning portion, the sliding mold is unnecessary. Therefore, a structure of the mold used for forming the main body frame can be simplified.

In at least an embodiment of the present invention, the driving source is desirably a solenoid, and the power transmission mechanism includes, as a sliding member, a lever member connected to the plunger of the solenoid. With this configuration, the plunger of the solenoid forms a part of the sliding member, and compared to when the second end of the cover portion is fixed to the plunger, possibility of occurrence of ingress of liquids into a current-carrying part of the solenoid can be reduced. Also, with this configuration, the sealing member can be designed without being affected by the shape of the plunger. Therefore, design flexibility of the sealing member can be improved.

As described above, in at least an embodiment of the present invention, in a card reader in which a locking member that prevents removal of a card inserted into the card reader is placed on a front side of a partitioning portion of a main body frame, a driving source that forms a part of a driving mechanism of the locking member is placed on a depth side of the partitioning portion and, an opening or a hole in which a part of the driving mechanism is placed is formed to penetrate through the partitioning portion, a sealing member, of which design can be simplified, is capable of preventing ingress of liquids into a water-proof area located on the depth side of the partitioning portion, and the locking member can be operated properly.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 5 is a side view of the card reader main body illustrated in FIG. 3 the upper frame, etc. removed therefrom.

DETAILED DESCRIPTION

Below, at least an embodiment of the present invention will be described with reference to the drawings.

General Configuration of Card Reader

Figure 1:
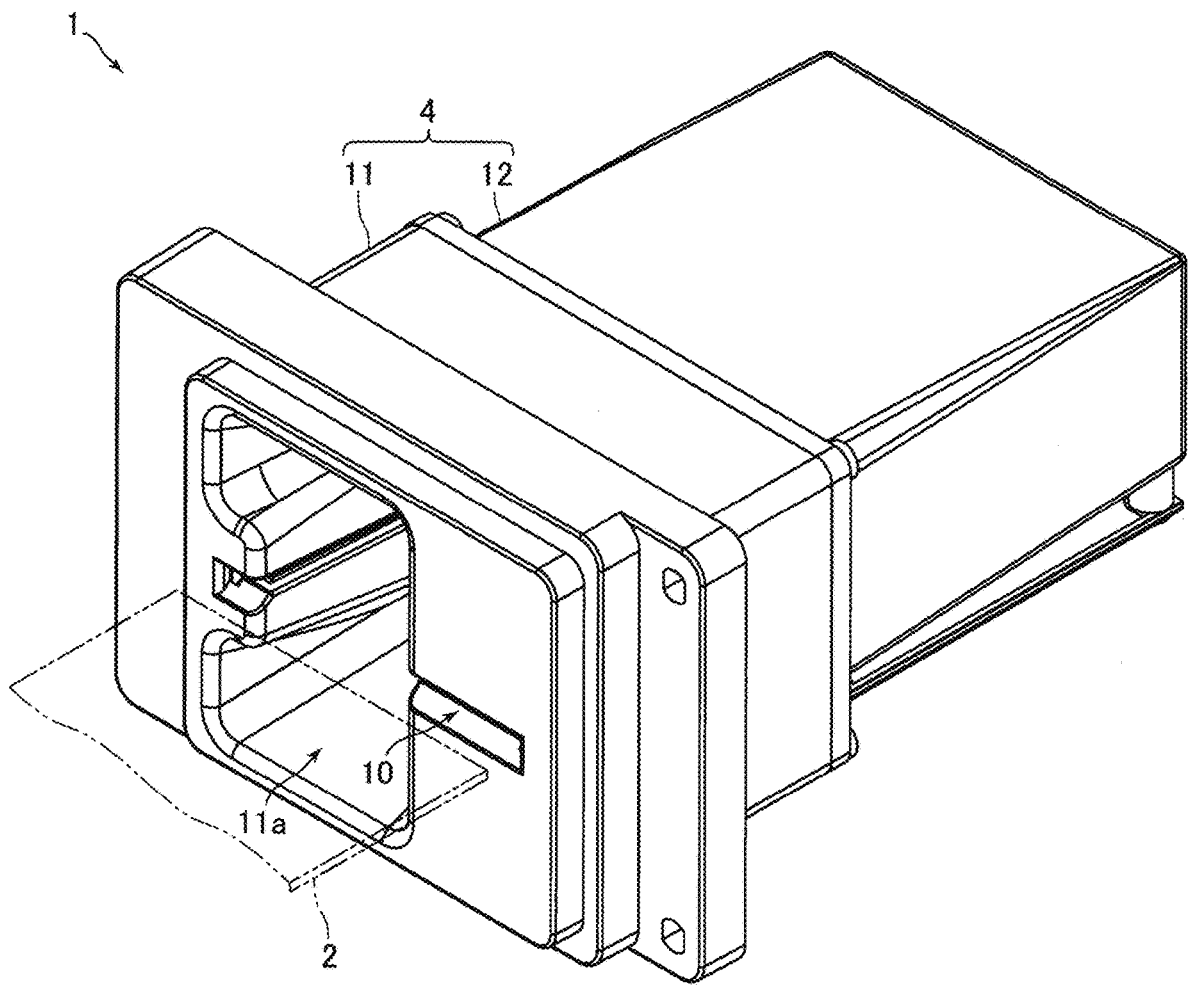
FIG. 1 is a perspective view of a card reader according to an embodiment of the present invention.
Figure 1:
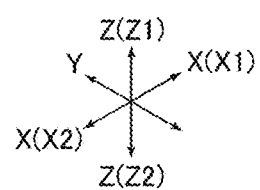
Figure 2:
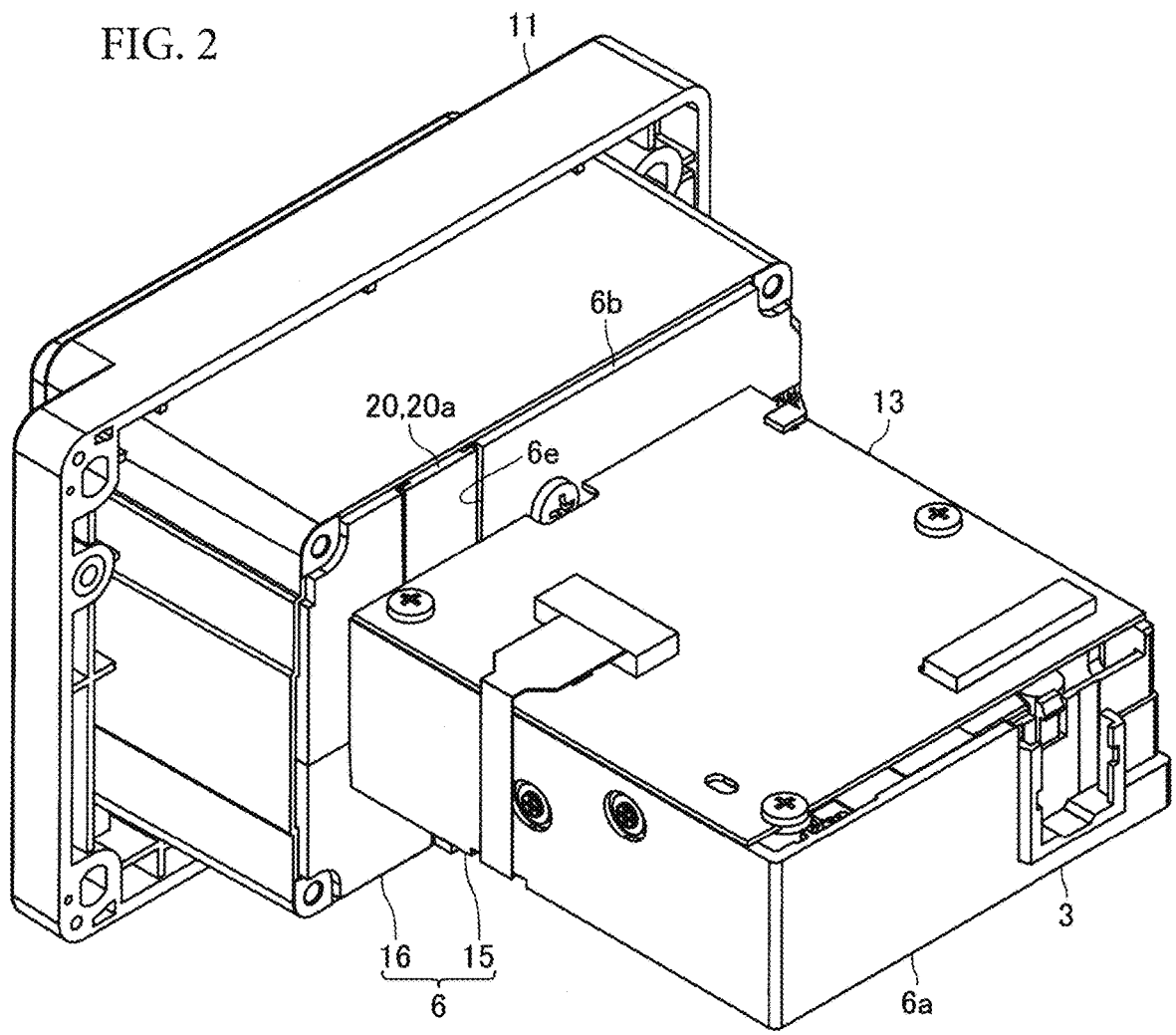
FIG. 2 is a perspective view, from another direction, of the card reader illustrated in FIG. 1 a case main body removed therefrom.
Figure 3:
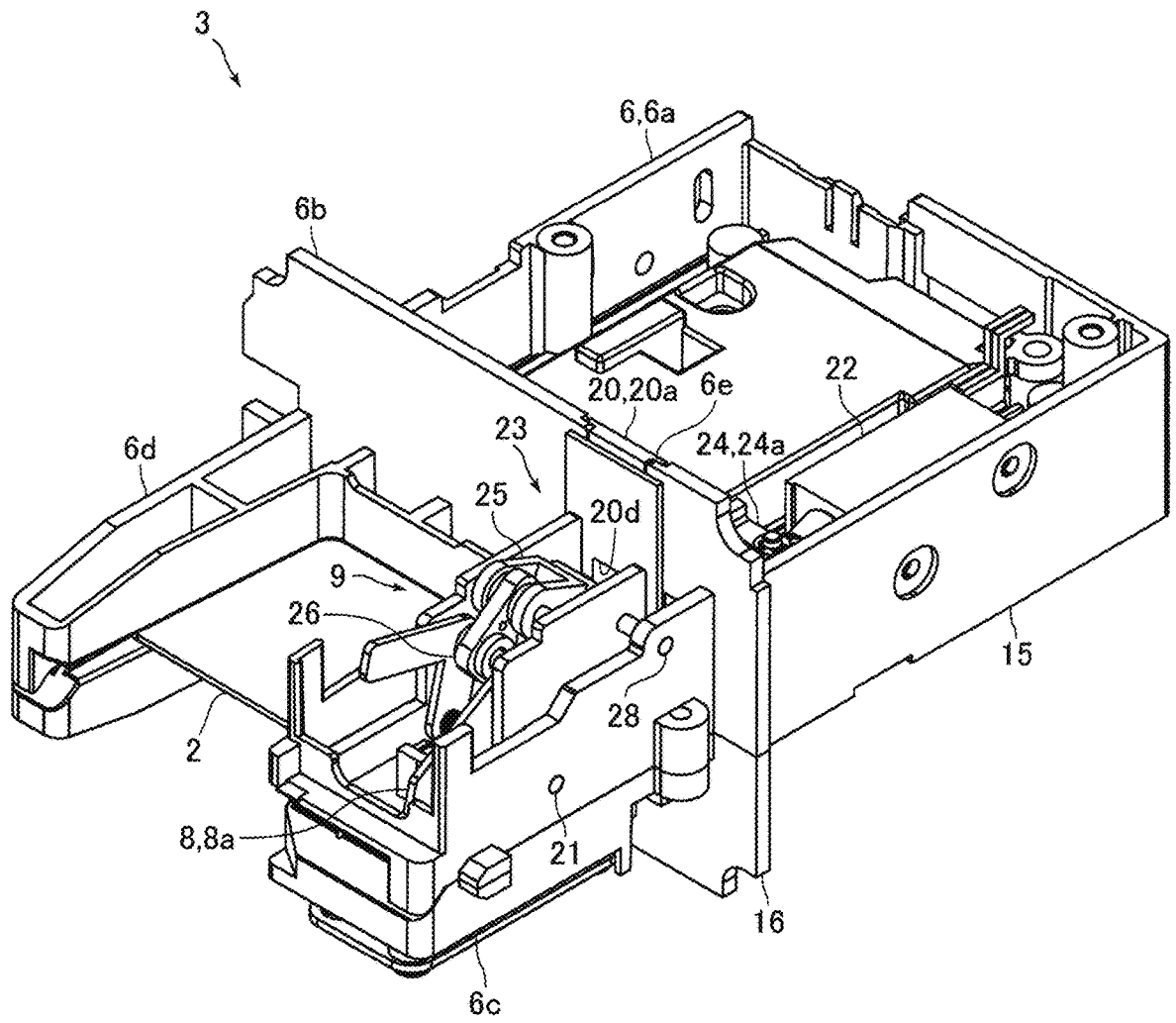
FIG. 3 is a perspective view of a card reader main body illustrated in FIG. 2.

FIG. 1 is a perspective view of a card reader 1 according to an embodiment of the present invention. FIG. 2 is a perspective view, from another direction, of the card reader 1 illustrated in FIG. 1 a case main body 12 removed therefrom. FIG. 3 is a perspective view of the card reader main body 3 illustrated in FIG. 2.

The card reader 1 of the present embodiment performs at least one of reading data recorded on a card 2 and recording data on the card 2. More specifically, the card reader 1 is a "dip type" card reader in which the card 2 is manually inserted into the card reader 1 for reading and recording data, and manually removed from the card reader 1. The card reader 1 is installed and used in, for example, an oil-feeding device in an unmanned or self-service gas station.

The card 2 is, for example, a rectangular card made of vinyl chloride and has a thickness of approximately 0.7 to 0.8 mm. Magnetic stripes on which magnetic data is recorded are formed on a first surface of the card 2. An IC chip is embedded in the card 2 and external connection terminals of the IC chip are formed on a second surface of the card 2. The card 2 may alternatively be a card made of polyethylene terephthalate (PET) having a thickness of approximately 0.18 to 0.36 mm, a card made of paper having a predetermined thickness, etc.

The card reader 1 includes a card reader main body 3 and a case body 4 covering the card reader main body 3. The card reader main body 3 includes a main body frame 6 in which a card travel path along which the card 2 travels is formed, a magnetic head 7 that reads magnetic data recorded on the card 2 and records magnetic data on the card 2 (see FIG. 4A and FIG. 4B), an IC contact block (not illustrated) including a plurality of IC contact springs for communicating data with the IC chip embedded in the card 2, a locking member 8 that prevents removal of the card 2 inserted into the card reader 1, and a driving mechanism 9 that drives the locking member 8. The case body 4 is formed by a front cover 11 and the case main body 12. An insertion opening 10 of the card 2 is formed in the front cover 11. The card reader 1 includes a control board 13 which is a printed board for control (see FIG. 2).

In the present embodiment, the card 2 which is operated manually travels in an X direction illustrated in FIG. 1 and other drawings. That is, the X direction is a direction in which the card 2 travels along the card travel path. The card 2 is inserted in an X1 direction and is removed in an X2 direction. A Z direction illustrated in FIG. 1 and other drawings that orthogonally crosses the X direction is a thickness direction of the card 2 inserted into the card reader 1. A Y direction illustrated in FIG. 1 and other drawings that orthogonally crosses the X direction and the Z direction is a width direction (a transverse direction) of the card 2 inserted in the card reader 1.

In the following description, the X direction in which the card 2 is inserted into and removed from the card reader 1 is a front-rear direction. The Y direction is the left-right direction, and the Z direction is an up-down direction. An X1 side which is a far side in the direction in which the card 2 is inserted into the card reader 1 is a "depth" side or a "rear (back)" side, and an X2 side which is a card-removing side in the direction in which the card 2 is removed from the card reader 1 is a "front" side. A Z1 side which is a first side in the up-down direction is an "upper" side, and a Z2 side which is a second side in the up-down direction is a "lower" side.

The main body frame 6 includes a bag-shaped card holding portion 6a in which an end part in the depth direction of the card 2 inserted into the card reader 1 (i.e., the card 2 inserted through the insertion opening 10), is placed, and a partitioning portion 6b extending as a flange from a front end of the card holding portion 6a. The main body frame 6 includes, as illustrated in FIG. 3, a head placement portion 6c on which the magnetic head 7 is placed, and a card guide portion 6d that guides the card 2 inserted through the insertion opening 10. The inside of the card holding portion 6a forms a part of the card travel path. Upper, lower, left, right, and rear sides of the card holding portion 6a have no opening through which the card travel path is exposed to the outside of the card holding portion 6a. The partitioning portion 6b is formed in a substantially rectangular frame shape extending in the up-down direction and the left-right direction from a front end of the card holding portion 6a.

The head placement portion 6c and the card guide portion 6d project on the front side from the partitioning portion 6b. The head placement portion 6c and the card guide portion 6d are formed a predetermined distance apart in the left-right direction. The magnetic head 7 is attached to a front end of the head placement portion 6c. The magnetic head 7 is placed to face the card travel path from below. The IC contact block is attached to the card holding portion 6a. The IC contact block is placed so that the IC contact springs face the card travel path from above.

The main body frame 6 is divided into two in the up-down direction and is thus formed by an upper frame 15 and a lower frame 16. The upper frame 15 forms an upper part of the main body frame 6. The lower frame 16 forms a lower part of the main body frame 6. The upper frame 15 and the lower frame 16 are assembled together and fixed to each other in the up-down direction. The upper frame 15 and the lower frame 16 are made of resin. That is, the main body frame 6 is made of resin. The upper frame 15 and the lower frame 16 are formed by resin molding using a mold.

The front cover 11 is placed on the front side of the main body frame 6 and covers the head placement portion 6c and the card guide portion 6d. The front cover 11 forms a front surface of the card reader 1. As illustrated in FIG. 1, a finger insertion portion 11a is formed in the front cover 11. The finger insertion portion 11a is recessed from the front surface of the front cover 11 toward the rear side. The finger insertion portion 11a is sized to receive inserted user fingers. When the user inserts the card 2 into the card reader 1, and when the user removes the card 2 from the card reader 1, the user inserts the fingers into the finger insertion portion 11a.

The case main body 12 is formed in a substantially rectangular box shape that opens at a front end thereof. The case main body 12 covers the card holding portion 6a and the partitioning portion 6b. An outer peripheral surface of the partitioning portion 6b is in contact with an inner peripheral surface of the case main body 12. The front cover 11 and the case main body 12 are fixed to each other a rear end of the front cover 11 and a front end of the case main body 12 being in contact with each other. The case body 4 covers upper, lower, left, right, front, and rear sides of the card reader main body 3. The main body frame 6 is housed in the case body 4.

In the present embodiment, an area located on the depth side of the partitioning portion 6b, outside the card holding portion 6a, and surrounded by the partitioning portion 6b and the case body 4 is a water-proof area in which ingress of liquids (e.g., water) is prevented. That is, an area outside the card holding portion 6a and surrounded by the partitioning portion 6b and the case main body 12 is a water-proof area. An area on the front side of the partitioning portion 6b and the card travel path are liquid-ingress-permission areas in which ingress of liquids (e.g., water) is permitted. The control board 13 is fixed to an upper end of the card holding portion 6a and is placed in the water-proof area.

The card reader 1 of the present embodiment includes a sealing member (gasket) 20 that prevents ingress of liquids into the water-proof area. That is, the card reader 1 includes a sealing member 20 that prevents ingress of liquids from the liquid-ingress-permission area into the water-proof area. Below, configurations of the locking member 8, the driving mechanism 9, the sealing member 20, and a periphery of the sealing member 20 will be described.

Figure 4A:
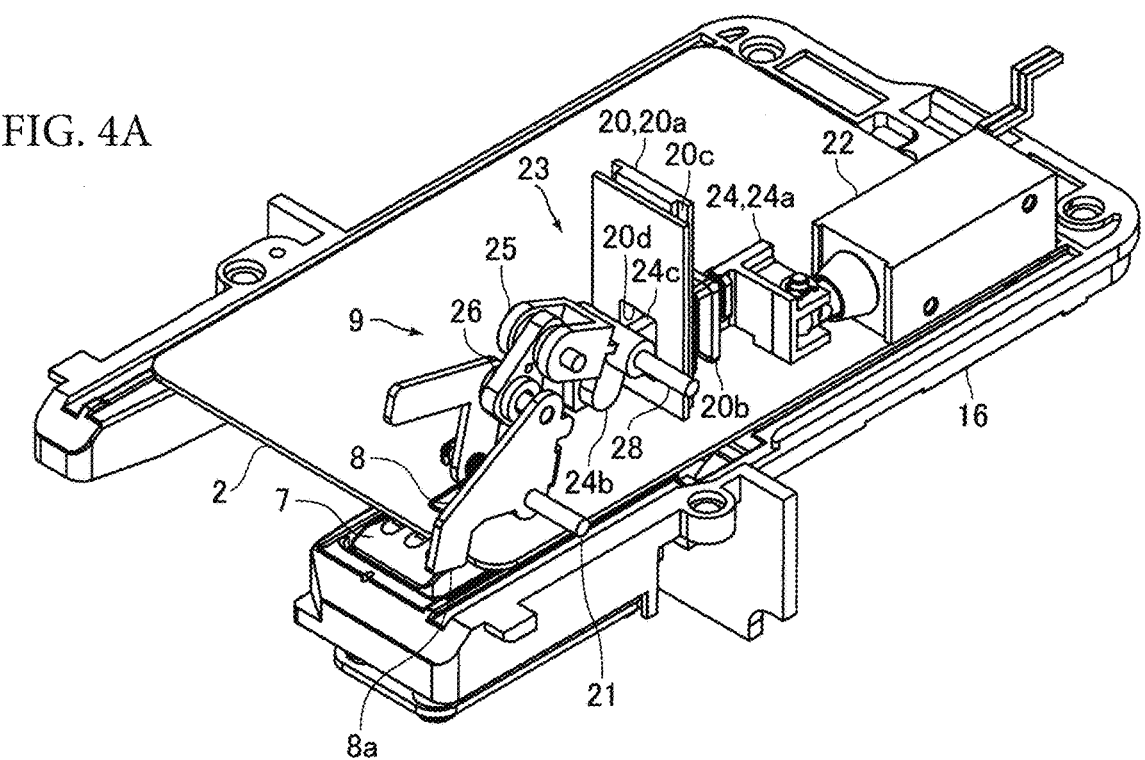
FIG. 4A is a perspective view of the card reader main body illustrated in FIG. 3 an upper frame, etc., removed therefrom.
Figure 4B:
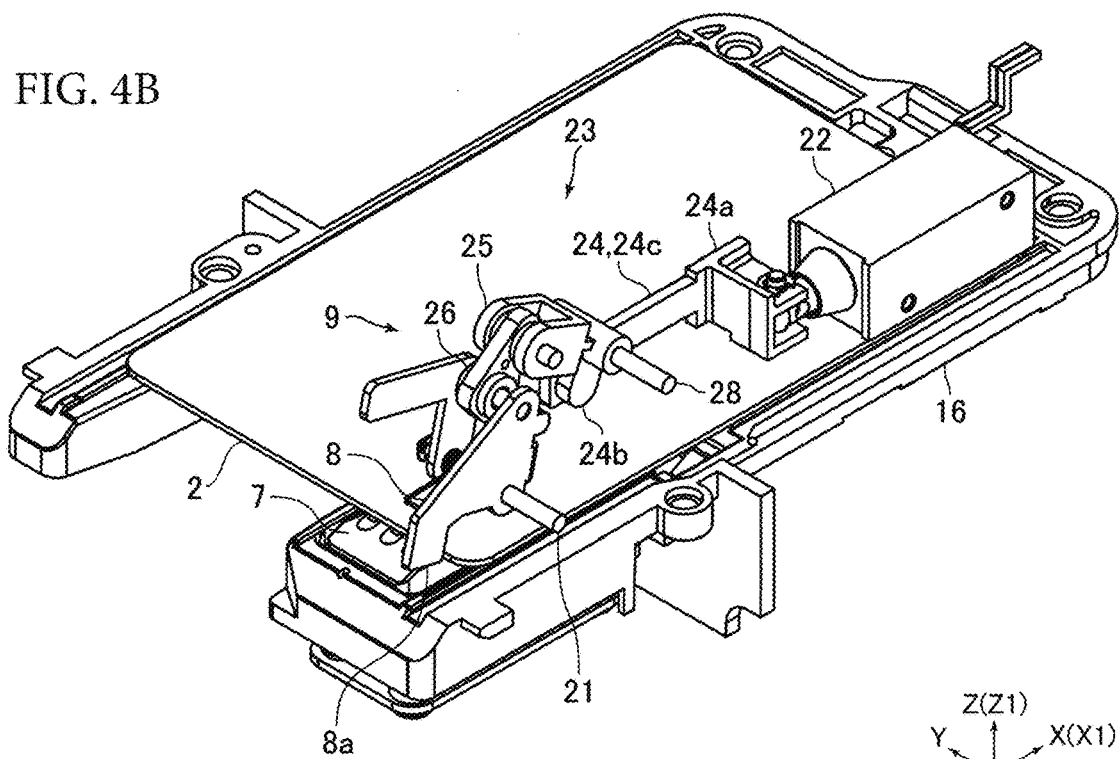
FIG. 4B is a perspective view of the card reader main body illustrated in FIG. 3 the upper frame, a sealing member, etc., removed therefrom.

Configurations of Locking Member, Driving Mechanism, Sealing Member, and Periphery of Sealing Member FIG. 4A is a perspective view of the card reader main body 3 illustrated in FIG. 3 the upper frame 15, etc., removed therefrom, and FIG. 4B is a perspective view of the card reader main body 3 illustrated in FIG. 3 the upper frame 15, the sealing member 20, etc., removed therefrom. FIG. 5 is a side view of the card reader main body 3 illustrated in FIG. 3 the upper frame 15, etc., removed therefrom.

The locking member 8 uses the IC contact block and prevents the card 2 from being removed from the card reader 1 while the card 2 inserted into the card reader 1 is communicating with the card reader 1. The locking member 8 includes a hook portion 8a which is in contact with the front end of the card 2 and prevents the card 2 from being removed from the card reader 1. The hook portion 8a forms a lower front end part of the locking member 8. The locking member 8 is attached to an upper surface side of the head placement portion 6c and on the front side of the partitioning portion 6b. The locking member 8 is placed inside the front cover 11. The locking member 8 is placed so that the hook portion 8a faces the card travel path from above.

Figure 4B:
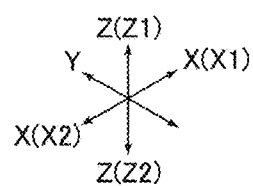

The locking member 8 is pivotable to a card-unremovable position in which the hook portion 8a is in contact with the front end of the card 2 and prevents the card 2 from being removed from the card reader 1, and a card-removable position (a position illustrated in FIG. 3 to FIG. 5) in which the hook portion 8a is retracted upward from the card travel path, which allows removal of the card 2 from the card reader 1. More specifically, the locking member 8 is rotatably held on the fixed shaft 21 that is fixed to the head placement portion 6c, and is pivotable to the card-unremovable position and the card-removable position. The fixed shaft 21 is placed so that an axial direction of the fixed shaft 21 coincides with the left-right direction. The locking member 8 is rotatable with the left-right direction being an axial direction of rotation. The fixed shaft 21 is inserted through a lower end part on the rear side of the locking member 8.

The driving mechanism 9 includes a solenoid 22 as a driving source, and a power transmission mechanism 23 which transmits power of the solenoid 22 to the locking member 8. The solenoid 22 is attached to an upper surface side of the card holding portion 6a, and is placed on the depth side of the partitioning portion 6b. The solenoid 22 is placed so that the plunger 22a of the solenoid 22 (see FIG. 5) moves linearly in the front-rear direction. The solenoid 22 is placed with the plunger 22a projecting on the front side. The power transmission mechanism 23 includes a lever member 24 as a sliding member connected to the plunger 22a, and two link members 25 and 26 for connecting the lever member 24 with the locking member 8.

A rear end of the lever member 24 is formed as a connecting portion 24a to be connected to the plunger 22a. A front end of the lever member 24 is formed as a connecting portion 24b to be connected to the link member 25. The connecting portion 24a and the connecting portion 24b are connected by a linear-shaped portion 24c. The connecting portion 24a is placed on the depth side of the partitioning portion 6b, and the connecting portion 24b is placed on the front side of the partitioning portion 6b. That is, the rear end of the lever member 24 is placed on the depth side of the partitioning portion 6b, and the front end of the lever member 24 is placed on the front side of the partitioning portion 6b.

The link members 25 and 26 are placed on the front side of the partitioning portion 6b. The link member 25 is substantially L-shaped when seen from the left-right direction. The center of the link member 25 is rotatably held on a fixed shaft 28 which is fixed to the head placement portion 6c. The fixed shaft 28 is placed so that an axial direction of the fixed shaft 28 coincides with the left-right direction. The link member 25 rotates with the left-right direction being an axial direction of rotation. The link member 26 is substantially rectangular when seen from the left-right direction.

The connecting portion 24a of the lever member 24 is rotatably connected to the plunger 22a. The connecting portion 24a is rotatable with respect to the plunger 22a with the up-down direction being an axial direction of rotation. A first end of the link member 25 is rotatably connected to the connecting portion 24b of the lever member 24. The link member 25 is rotatable with respect to the connecting portion 24b with the left-right direction being an axial direction of rotation. The first end of the link member 25 is placed below the fixed shaft 28.

A first end of the link member 26 is rotatably connected to a second end of the link member 25. The link member 26 is rotatable with respect to the link member 25 with the left-right direction being an axial direction of rotation. The second end of the link member 25 is placed on the front side of the fixed shaft 28. An upper end part of the locking member 8 on the rear side is rotatably connected to the second end of the link member 26. The locking member 8 is rotatable with respect to the link member 26 with the left-right direction being an axial direction of rotation. In the present embodiment, when the plunger 22a of the solenoid 22 moves in the front-rear direction, the lever member 24 moves linearly in the front-rear direction.

An opening 6e is formed in the partitioning portion 6b. A part of the linear-shaped portion 24c is placed in the opening 6e. That is, the opening 6e in which a part of the lever member 24 is placed is formed in the partitioning portion 6b. The opening 6e penetrates through the partitioning portion 6b in the front-rear direction. The opening 6e is formed to reach an upper end surface of the partitioning portion 6b. The opening 6e is rectangular in shape when seen in the front-rear direction. The opening 6e is formed in the upper frame 15.

The sealing member 20 is made of rubber. The sealing member 20 includes a seal body portion 20a which seals the opening 6e and a cover portion 20b which covers a part of the linear-shaped portion 24c from an outer peripheral side. The sealing member 20 of the present embodiment is formed by the seal body portion 20a and the cover portion 20b. The seal body portion 20a and the cover portion 20b are integrated with each other. The seal body portion 20a is rectangular flat shaped. The seal body portion 20a is placed so that the thickness direction thereof coincides with the front-rear direction thereof. The seal body portion 20a is placed in the entire area from the upper end to the lower end of the opening 6e.

A notch 20c to fit into an edge of the opening 6e is formed in both left and right end surfaces and a lower end surface of the seal body portion 20a. The seal body portion 20a fits into the opening 6e. The notch 20c is formed to be recessed inwardly in the left-right direction from both left and right end surfaces of the seal body portion 20a, and recessed upwardly from the lower end surface of the seal body portion 20a. A through hole 20d is formed in the seal body portion 20a. The lever member 24 is inserted (more specifically, the linear-shaped portion 24c is inserted) through the through hole 20d. The through hole 20d penetrates through the seal body portion 20a in the front-rear direction. The through hole 20d is formed at the lower end of the seal body portion 20a.

The cover portion 20b is formed in a cylindrical shape. A first end of the cover portion 20b is connected to the seal body portion 20a, and a second end of the cover portion 20b is attached to the lever member 24. More specifically, a front end of the cover portion 20b is connected to a surface of the seal body portion 20a on the depth side so as to surround the through hole 20d of the seal body portion 20a from the outer peripheral side. A rear end of the cover portion 20b is fixed to a border portion between the connecting portion 24a and the linear-shaped portion 24c, and the cover portion 20b is placed on the depth side of the partitioning portion 6b. The linear-shaped portion 24c of the lever member 24 is placed to penetrate through the cover portion 20b on the inner peripheral side. The through hole 20d of the seal body portion 20a is sealed by the cover portion 20b from the rear side.

The cover portion 20b of the present embodiment is formed in a bellows shape. That is, the cover portion 20b is formed in a bellows shape in which portions bent upward and downward repeatedly appear in the front-rear direction. As described above, when the plunger 22a of the solenoid 22 moves in the front-rear direction, the lever member 24 moves linearly in the front-rear direction. When the lever member 24 moves linearly in the front-rear direction, the cover portion 20b extends and contracts in the front-rear direction following the front and rear movement of the lever member 24.

Main Effect of Present Embodiment

As described above, in the present embodiment, the power transmission mechanism 23 which transmits power to the locking member 8 includes the lever member 24 moving linearly in the front-rear direction, and a part of the lever member 24 is placed in the opening 6e formed in the partitioning portion 6b of the main body frame 6. In the present embodiment, the sealing member 20 which prevents ingress of liquids into the water-proof area on the depth side of the partitioning portion 6b includes the seal body portion 20a that seals the opening 6e, and the cylindrical cover portion 20b of which front end is connected to the seal body portion 20a and rear end is attached to the lever member 24. The cover portion 20b extends and contracts in the front-rear direction following the front and rear movement of the lever member 24.

That is, in the present embodiment, the cover portion 20b that transforms with the movement of the lever member 24 simply extends and contracts in the front-rear direction. Therefore, in the present embodiment, followability of the cover portion 20b with respect to the movement of the lever member 24 can be obtained even if the shape, etc., of the cover portion 20b are not that carefully considered. That is, followability of the cover portion 20b with respect to the movement of the locking member 8 can be obtained even if the shape, etc., of the cover portion 20b are not that carefully considered. Therefore, in the present embodiment, the sealing member 20, of which design can be simplified, is capable of preventing ingress of liquids into the water-proof area located on the depth side of the partitioning portion 6b, and the locking member 8 can be operated properly.

The cover portion 20b of the present embodiment is formed in a bellows shape. Therefore, in the present embodiment, load to which the solenoid 22 is exposed upon extension and contraction of the cover portion 20b can be reduced. Therefore, in the present embodiment, a solenoid 22 with lower power can be employed, which can reduce the cost of the card reader 1.

In the present embodiment, the link members 25 and 26 are placed on the front side of the partitioning portion 6b, the front end of the cover portion 20b is connected to a surface on the depth side of the seal body portion 20a, and the cover portion 20b is placed on the depth side of the partitioning portion 6b. Therefore, in the present embodiment, the cover portion 20b can be easily placed compared to when the cover portion 20b is placed on the front side of the partitioning portion 6b.

Other Embodiments

The embodiment described above is one possible example of an embodiment of the present invention, but the invention is not limited to this. Various modified embodiments are possible without departing from the scope of the present invention.

In the embodiment described above, the rear end of the cover portion 20b may be attached to the plunger 22a of the solenoid 22. In this case, the lever member 24 and the plunger 22a form a sliding member that moves linearly in the front-rear direction. That is, in this case, the solenoid 22 and the power transmission mechanism 23 include a sliding member that moves linearly in the front-rear direction.

However, when the rear end of the cover portion 20b is attached to the lever member 24 as in the embodiment described above, compared to when the rear end of the cover portion 20b is attached to the plunger 22a, possibility of occurrence of ingress of liquids into the current-carrying part of the solenoid 22 can be reduced. Also, when the rear end of the cover portion 20b is attached to the lever member 24 as in the embodiment described above, the sealing member 20 can be designed without being affected by the shape of the plunger 22a. Therefore, design flexibility of the sealing member 20 can be improved.

In the embodiment described above, a hole (a hole that does not extend to reach the upper end surface of the partitioning portion 6b) may be formed, instead of the opening 6e, to penetrate through the partitioning portion 6b in the front-rear direction. A part of the linear-shaped portion 24c is placed in the hole. In this case, the seal body portion 20a fits in the hole to seal the hole. However, when the opening 6e is formed in the partitioning portion 6b as in the embodiment described above, a structure of the mold used for forming the main body frame 6 (more specifically, the mold used for forming the upper frame 15) can be simplified. That is, when a hole penetrating through the partitioning portion 6b in the front-rear direction is formed in the partitioning portion 6b, a sliding mold is necessary as a mold used for forming the upper frame 15, whereas when the opening 6e extending to reach the upper end surface of the partitioning portion 6b is formed in the partitioning portion 6b, the sliding mold is unnecessary. Therefore, a structure of the mold used for forming the upper frame 15 can be simplified.

In the embodiment described above, the rear end of the cover portion 20b may be connected to the front side of the seal body portion 20a. In this case, the front end of the cover portion 20b is fixed, for example, to a border portion between the connecting portion 24b and the linear-shaped portion 24c of the lever member 24, and the cover portion 20b is placed on the front side of the partitioning portion 6b. Also, in the embodiment described above, the cover portion 20b does not necessarily have to be formed in a bellows shape. That is, portions bent upward and downward do not necessarily have to appear. In this case, for example, the cover portion 20b is formed in a thin cylindrical shape.

In the embodiment described above, the driving mechanism 9 may include a motor as a driving source instead of the solenoid 22. Also, in the embodiment described above, the magnetic head 7 may be excluded from the card reader main body 3. In the embodiment described above, the card reader 1 is a manual card reader. However, the card reader 1 may be a card transport-type card reader equipped with a card transport mechanism that automatically transports the card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader that performs at least one of reading data recorded on a card and recording data on the card, in which, when a far side in a direction in which the card is inserted into the card reader is a depth side, a card-removing side in a direction in which the card is removed from the card reader is a front side, and a direction in which the card is inserted into and removed from the card reader is a front-rear direction, the card reader comprising,
a main body frame comprising a bag-shaped card holding portion in which an end part of the card on the depth side is housed and a partitioning portion that extends from a front end of the card holding portion in an orthogonal direction to the front-rear direction;
a case body in which the main body frame is housed;
a locking member configured to prevent removal of the card inserted into the card reader;
a driving mechanism configured to drive the locking member; and
a sealing member configured to prevent ingress of liquids into an area located on the depth side of the partitioning portion, outside the card holding portion, and surrounded by the partitioning portion and the case body, wherein
the locking member is provided on the front side of the partitioning portion,
the driving mechanism comprises a driving source placed on the depth side of the partitioning portion and a power transmission mechanism that transmits power of the driving source to the locking member,
the driving source and the power transmission mechanism or the power transmission mechanism comprises a sliding member moving linearly in the front-rear direction,
an opening or a hole in which a part of the sliding member is placed is formed in the partitioning portion to penetrate through the partitioning portion in the front-rear direction,
the sealing member comprises a seal body portion configured to seal the opening or the hole, and a cylindrical cover portion of which a first end is connected to the seal body portion and a second end is attached to the sliding member,
a through hole through which the sliding member is passed is formed to penetrate the seal body portion in the front-rear direction,
the first end of the cover portion is connected to a surface on the front side or a surface on the depth side of the seal body portion to surround the through hole,
the sliding member is provided so as to penetrate through the cover portion on an inner peripheral side, and
the cover portion extends and contracts in the front-rear direction following the front and rear movement of the sliding member.

2. The card reader according to claim 1, wherein the cover portion is formed in a bellows shape.

3. The card reader according to claim 2, wherein
the locking member is structured to pivot between a card-unremovable position in which the card is unremovable from the card reader, and a card-removable position in which the card is removable from the card reader,
the first end of the cover portion is connected to a surface on the depth side of the seal body portion, and
the cover portion is placed on the depth side of the partitioning portion.

4. The card reader according to claim 3, wherein
the opening extending to reach one end surface of the partitioning portion in the thickness direction of the card inserted into the card reader is formed in the partitioning portion.

5. The card reader according to claim 4, wherein
the driving source is a solenoid, and
the power transmission mechanism comprises, as the sliding member, a lever member connected to a plunger of the solenoid.

6. The card reader according to claim 3, wherein
the driving source is a solenoid, and
the power transmission mechanism comprises, as the sliding member, a lever member connected to a plunger of the solenoid.

7. The card reader according to claim 2, wherein
the opening extending to reach one end surface of the partitioning portion in the thickness direction of the card inserted into the card reader is formed in the partitioning portion.

8. The card reader according to claim 7, wherein
the driving source is a solenoid, and
the power transmission mechanism comprises, as the sliding member, a lever member connected to a plunger of the solenoid.

9. The card reader according to claim 2, wherein
the driving source is a solenoid, and the power transmission mechanism comprises, as the sliding member, a lever member connected to a plunger of the solenoid.

10. The card reader according to claim 1, wherein
the locking member is structured to pivot between a card-unremovable position in which the card is unremovable from the card reader, and a card-removable position in which the card is removable from the card reader,
the first end of the cover portion is connected to a surface on the depth side of the seal body portion, and
the cover portion is placed on the depth side of the partitioning portion.

11. The card reader according to claim 10, wherein
the opening extending to reach one end surface of the partitioning portion in the thickness direction of the card inserted into the card reader is formed in the partitioning portion.

12. The card reader according to claim 11, wherein
the driving source is a solenoid, and
the power transmission mechanism comprises, as the sliding member, a lever member connected to a plunger of the solenoid.

13. The card reader according to claim 10, wherein
the driving source is a solenoid, and
the power transmission mechanism comprises, as the sliding member, a lever member connected to a plunger of the solenoid.

14. The card reader according to claim 1, wherein
the opening extending to reach one end surface of the partitioning portion in the thickness direction of the card inserted into the card reader is formed in the partitioning portion.

15. The card reader according to claim 14, wherein
the driving source is a solenoid, and
the power transmission mechanism comprises, as the sliding member, a lever member connected to a plunger of the solenoid.

16. The card reader according to claim 1, wherein
the driving source is a solenoid, and
the power transmission mechanism comprises, as the sliding member, a lever member connected to a plunger of the solenoid.

* * * * *